US009626595B2

(12) United States Patent
Gandolph et al.

(10) Patent No.: US 9,626,595 B2
(45) Date of Patent: Apr. 18, 2017

(54) METHOD AND APPARATUS FOR TRACKING SUPERPIXELS BETWEEN RELATED IMAGES

(71) Applicant: THOMSON LICENSING, Issy de Moulineaux (FR)

(72) Inventors: Dirk Gandolph, Ronnenberg (DE); Wolfram Putzke-Roeming, Hildesheim (DE); Andrej Schewzow, Hannover (DE)

(73) Assignee: THOMSON LICENSING, Issy de Moulineaux (FR)

( * ) Notice: Subject to any disclaimer, the term of this patent is extended or adjusted under 35 U.S.C. 154(b) by 0 days.

(21) Appl. No.: 14/795,443

(22) Filed: Jul. 9, 2015

(65) Prior Publication Data
US 2016/0012313 A1    Jan. 14, 2016

(30) Foreign Application Priority Data

Jul. 10, 2014  (EP) .................................... 14306126
Oct. 27, 2014  (EP) .................................... 14306706

(51) Int. Cl.
*G06K 9/48*   (2006.01)
*G06K 9/62*   (2006.01)
(Continued)

(52) U.S. Cl.
CPC ............. *G06K 9/6215* (2013.01); *G06K 9/46* (2013.01); *G06K 9/6232* (2013.01);
(Continued)

(58) Field of Classification Search
None
See application file for complete search history.

(56) References Cited

U.S. PATENT DOCUMENTS

| 8,588,518 B2 | 11/2013 | Wang et al. |
| 2005/0094898 A1 | 5/2005 | Xu et al. |
| 2007/0086621 A1 | 4/2007 | Aggarwal et al. |

FOREIGN PATENT DOCUMENTS

| CN | 103632167 | 3/2014 |
| CN | 103700091 | 4/2014 |

(Continued)

OTHER PUBLICATIONS

Vazquez-Reina, A., Avidan, S., Pfister, H., & Miller, E. (Sep. 2010). Multiple hypothesis video segmentation from superpixel flows. In European conference on Computer vision (pp. 268-281). Springer Berlin Heidelberg.*

(Continued)

*Primary Examiner* — Sumati Lefkowitz
*Assistant Examiner* — David Perlman
(74) *Attorney, Agent, or Firm* — Tutunjian & Bitetto, P.C.

(57) ABSTRACT

A method for pixel mapping between an origin superpixel in a first image and a target superpixel in a second image and an apparatus configured to perform the method. The apparatus comprises a feature vector determining unit, which determines a feature vector of an origin pixel of the origin superpixel and which further determines feature vectors of target pixels of the target superpixel. A mapping pixel selector selects a mapping pixel for the origin pixel among the target pixels based on a comparison of the feature vectors.

36 Claims, 8 Drawing Sheets

(51) Int. Cl.
   *G06T 7/00*   (2017.01)
   *G06K 9/46*   (2006.01)
   *G06T 7/20*   (2017.01)
   *G06T 7/60*   (2017.01)

(52) U.S. Cl.
   CPC .......... *G06T 7/0034* (2013.01); *G06T 7/0085* (2013.01); *G06T 7/0097* (2013.01); *G06T 7/208* (2013.01); *G06T 7/60* (2013.01); *G06T 2207/10016* (2013.01); *G06T 2207/10052* (2013.01)

(56) References Cited

FOREIGN PATENT DOCUMENTS

| CN | 103761736 | 4/2014 |
| EP | 2109080 | 10/2009 |
| EP | 14306130.7 | 7/2014 |

OTHER PUBLICATIONS

Achanta et al.: "SLIC superpixels compared to state-of-the-art superpixel methods"; IEEE Transactions on Pattern Analysis and Machine Intelligence, vol. 34 No. 11; Nov. 2012; pp. 2274-2281.
Liu et al.: "Entropy Rate Superpixel Segmentation"; 2011 IEEE Conference on Computer Vision and Pattern Recognition (CVPR); Jun. 20, 2011' pp. 1-12.
Ren et al.: "Learning a classification model for segmentation"; IEEE International Conference on Computer Vision (ICCV); pp. 10-17; 2003 1, 7; Oct. 13, 2003.
Reso et al.: "Temporally Consistent Superpixels"; IEEE International Conference on Computer Vision (ICCV); Dec. 2013; pp. 1-8.
Liao et al.: "Moving Object Detection for Moving Cameras on Superpixel Level", 2013 Seventh International Conference Onimage and Graphics, IEEE, Jul. 26, 2013 (Jul. 26, 2013), pp. 307-312.
Search Report Dated May 7, 2015.

* cited by examiner $t_0$  $t_1$  $t_2$ $t_0$  $t_1$  $t_2$

Mass Center Positions

METHOD AND APPARATUS FOR TRACKING SUPERPIXELS BETWEEN RELATED IMAGES

This application claims the benefit, under 35 U.S.C. §119 of European Patent Application No. 14306126.5, filed Jul. 10, 2014 and European Patent Application No. 14306706.4, filed on Oct. 27, 2014.

FIELD OF THE INVENTION

The invention relates to a method and an apparatus for tracking superpixels between related images. More specifically, a method and an apparatus for micro tracking of superpixels in temporally or spatially related images are described, which make use of asymmetric pixel mapping.

BACKGROUND OF THE INVENTION

Over the last decade superpixel algorithms have become a broadly accepted and applied method for image segmentation, providing a reduction in complexity for subsequent processing tasks. Superpixel segmentation provides the advantage of switching from a rigid structure of the pixel grid of an image to a semantic description defining objects in the image, which explains its popularity in image processing and computer vision algorithms.

Research on superpixel algorithms began with a processing intensive feature grouping method proposed in [1]. Subsequently, more efficient solutions for superpixel generation were proposed, such as the simple linear iterative clustering (SLIC) method introduced in [2]. While earlier solutions focused on still images, later developments aimed at applications of superpixels for video, which require their temporal consistency. In [3] an approach achieving this demand is described, which provides traceable superpixels within video sequences.

The temporal dimension in image processing and computer vision algorithms requires the tracking of objects in video by tracking superpixels over time. This is an easy task when a macro tracking of superpixels is needed, requiring a simple superpixel-to-superpixel mapping. More often, however, image processing requires a micro tracking, describing the pixel-to-pixel correspondence between temporally adjacent superpixels, i.e. between macro tracked superpixels.

The difficulty of micro tracking arises from the shape of the superpixels deforming over time. While this does not harm the macro tracking, it definitely eliminates the possibility for a straightforward pixel-to-pixel assignment between temporally corresponding superpixels. The changes in the superpixel shapes cause at least a relative pixel shift. Most often the superpixel shape deformation also changes the superpixel size, resulting in a superpixel pixel count difference between temporally adjacent superpixels. This requires an asymmetric pixel mapping instead of a one-to-one pixel mapping for the superpixel micro tracking.

The quality of superpixel micro tracking can be measured by their isogonic projection and the coverage reached for an asymmetric pixel mapping. The isogonic projection describes the relative pixel order given by the mapping, and the coverage refers to the percentage of pixels pointed at for the asymmetric mapping. For the case of a bad coverage the asymmetric mapping excludes large parts of the target superpixel by linking multiple and more than necessary pixels of the origin superpixel to a single pixel located within the target superpixel. This leads to unnecessary holes in the map, which exclude pixel locations of the target superpixel.

Apart from the temporal superpixel assignment aspect in image processing, similar problems arise for a multi-view superpixel assignment, which is required in light field camera and other multi-view applications. Temporal superpixels and multi-view superpixels are interchangeable items. Therefore, the temporal aspects of object related pixel assignments can be transferred to multi-view aspects of them. Those multi-view aspects are extensively used in image processing applied for light field cameras, for example.

SUMMARY OF THE INVENTION

It is an object of the present invention to propose an improved solution for micro tracking of superpixels in temporally or spatially related images.

According to the invention, a method for pixel mapping between an origin superpixel in a first image and a target superpixel in a second image comprises:
  determining a feature vector of an origin pixel of the origin superpixel;
  determining feature vectors of target pixels of the target superpixel; and
  selecting a mapping pixel for the origin pixel among the target pixels based on a comparison of the feature vectors.

Accordingly, a computer readable storage medium has stored therein instructions enabling pixel mapping between an origin superpixel in a first image and a target superpixel in a second image, which, when executed by a computer, cause the computer to:
  determine a feature vector of an origin pixel of the origin superpixel;
  determine feature vectors of target pixels of the target superpixel; and
  select a mapping pixel for the origin pixel among the target pixels based on a comparison of the feature vectors.

Also, in one embodiment an apparatus configured to perform pixel mapping between an origin superpixel in a first image and a target superpixel in a second image comprises:
  a feature vector determining unit configured to determine a feature vector of an origin pixel of the origin superpixel and to determine feature vectors of target pixels of the target superpixel; and
  a mapping pixel selector configured to select a mapping pixel for the origin pixel among the target pixels based on a comparison of the feature vectors.

In another embodiment, an apparatus configured to perform pixel mapping between an origin superpixel in a first image and a target superpixel in a second image comprises a processing device and a memory device having stored therein instructions, which, when executed by the processing device, cause the apparatus to:
  determine a feature vector of an origin pixel of the origin superpixel;
  determine feature vectors of target pixels of the target superpixel; and
  select a mapping pixel for the origin pixel among the target pixels based on a comparison of the feature vectors.

The proposed solution uses a geometrical asymmetric pixel mapping, which is based, for example, on relating the mass centers of the pair of mapped superpixels in the first image and the second image to each other. Depending on the application of the approach in the temporal domain or in the spatial domain, the first image and the second image are successive images of a sequence of images, multi-view images of a scene, or even sequences of multi-view images of a scene.

In one embodiment, a feature vector of a pixel comprises a relative distance of the pixel to a mass center of the superpixel and a topology value of the pixel. For each pixel location in the origin superpixel the following parameters are determined: the angle relative to its mass center, its relative distance to the mass center, and its topology value. The topology value of the pixel indicates a minimal distance of the pixel to a nearest superpixel border. Topology value and relative distance of the origin superpixel form a feature vector, whose best representative is searched for within the target superpixel.

In one embodiment, the target pixels are determined by:
  determining a ray starting in the mass center of the origin superpixel and passing through the origin pixel;
  determining a corresponding ray for the target superpixel starting in the mass center of the target superpixel; and
  selecting target pixels along the corresponding ray starting in the mass center of the target superpixel.

The search for the best match of a similarly formed feature vector within the target superpixel begins from the target superpixel mass center and follows the ray having the same angle as determined in the origin superpixel. A matching quality measure is determined using the Euclidian vector distance. Preferably, the first minimum found for the feature vector distance while following the ray within the target superpixel is taken as the optimal mapping position.

In one embodiment, for determining the corresponding ray for the target superpixel a scaling of the target superpixel relative to the origin superpixel is taken into account. Preferably, the superpixel is divided into four quadrants and a horizontal and a vertical scaling is determined individually for each of the quadrants. An advanced technique applies an additional scaling along the search rays, which is called Quadrant Scaled Superpixel Mapping, to compensate for nonlinear distortions and size changes that are present in practice for superpixel pairs. The Quadrant Scaled Superpixel Mapping approximates nonlinear superpixel shape distortion, which is superior to the otherwise used Uniform Scaled Superpixel Mapping by improving the overall coverage of the asymmetric mapping algorithm.

The proposed solution leads to an isogonic pixel mapping between two related superpixels, i.e. temporally or spatially adjacent superpixels, with an optimal coverage. This ensures an optimal micro tracking, which is a prerequisite for efficient image processing in the temporal domain as well as for computer vision algorithms such as multiclass object segmentation, depth estimation, segmentation, body model estimation, and object localization. The proposed approach provides micro maps of high quality, handles arbitrary superpixel shapes, including concave shapes, and is robust by tolerating arbitrary superpixel distortions over time.

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims.

DETAILED DESCRIPTION OF PREFERRED EMBODIMENTS

Figure 1:
FIG. 1 shows an example of an image before segmentation into superpixels.
Figure 2:
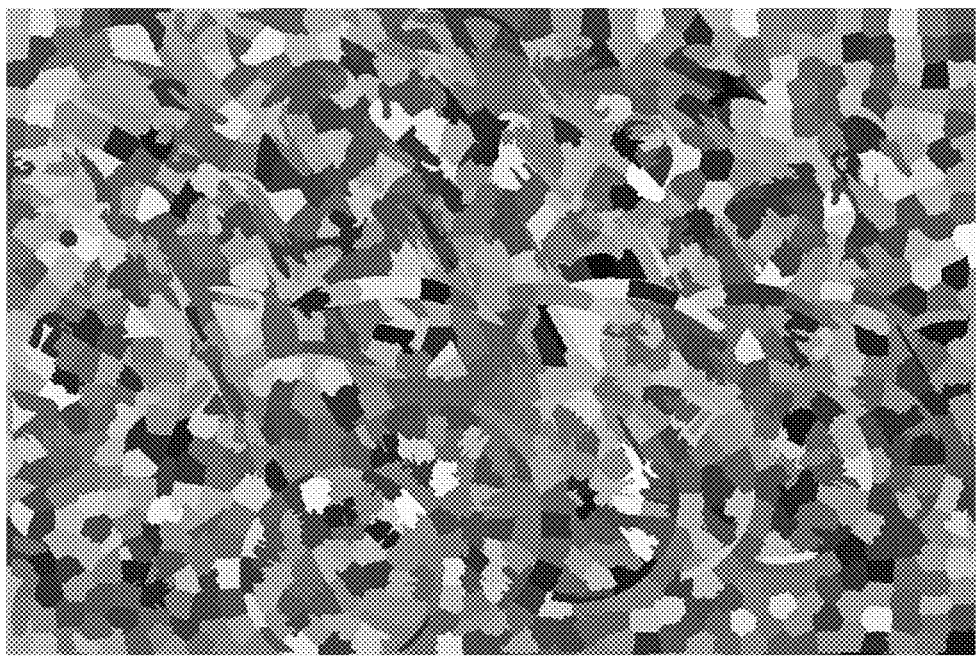
FIG. 2 shows the image of FIG. 1 after segmentation into superpixels.

Superpixels represent an over-segmentation of image data which is useful for object detection and allows a reduction in complexity for subsequent processing tasks. FIG. 1 shows an example of an image being segmented into superpixel areas as depicted in FIG. 2, where each superpixel is represented using a different grey value. The image representation in FIG. 2 is called a superpixel label map.

In the following the invention is explained with a focus on superpixels in temporally adjacent images, e.g. images of a video sequence. However, the described approach is likewise applicable to spatially related images, e.g. multi-view images and sequences of multi-view images.

Figure 3:
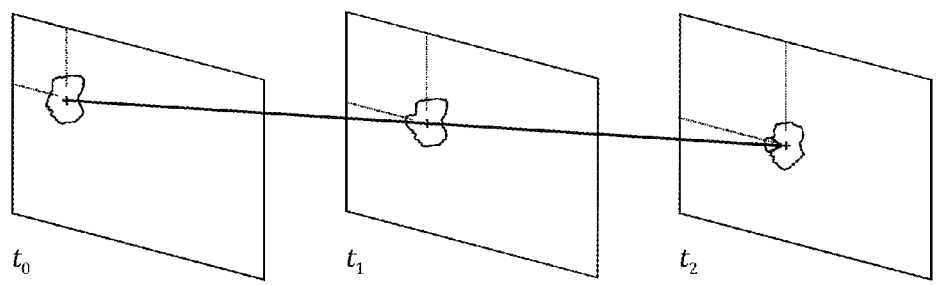
FIG. 3 shows an example of a single temporally consistent superpixel being tracked over a period of three frames.

The technique of temporally consistent superpixels extends the over-segmentation of single images to videos, allowing object tracking over time. FIG. 3 shows an example of a single temporally consistent superpixel being tracked over the period of three frames, where the superpixels follow a moving object in the video scene depicted in the images $t_0$, $t_1$, and $t_2$. From the figure it can also be seen that the shape of the superpixel slightly changes with each new image.

Figure 4:
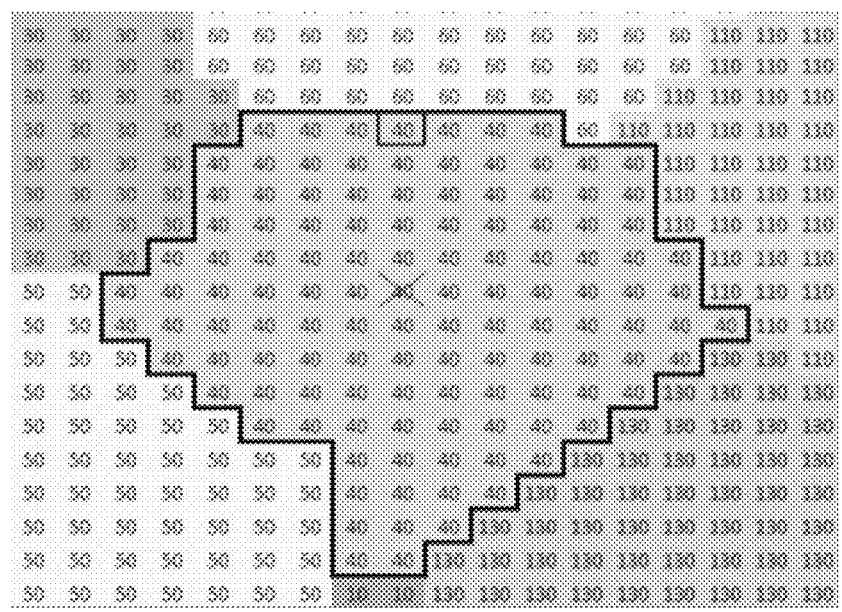
FIG. 4 depicts an example of a superpixel segmentation used for generating a superpixel topology map.
Figure 5:
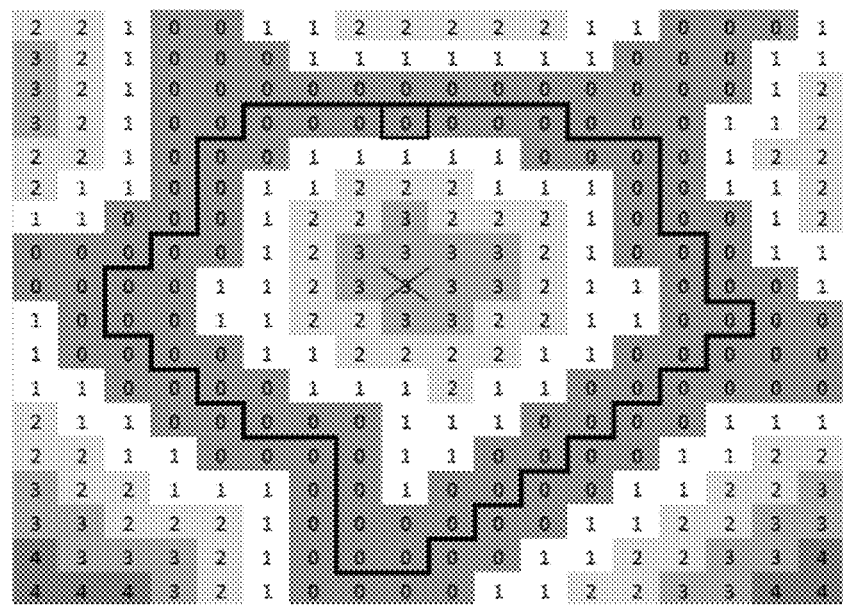
FIG. 5 shows the superpixel topology map generated for the superpixel segmentation of FIG. 4.

The superpixel segmentation—represented by a superpixel label map—can be utilized to generate a superpixel topology map. The topology map expresses for each pixel position the minimal distance to the nearest superpixel border. FIG. 4 shows an example of a superpixel segmentation used to generate its superpixel topology map, which for this example is depicted in FIG. 5. For each pixel in the topology map the values in FIG. 5 represent the smallest number of steps needed to reach a superpixel border pixel, or in other words, the distance to the nearest border.

Figure 6:
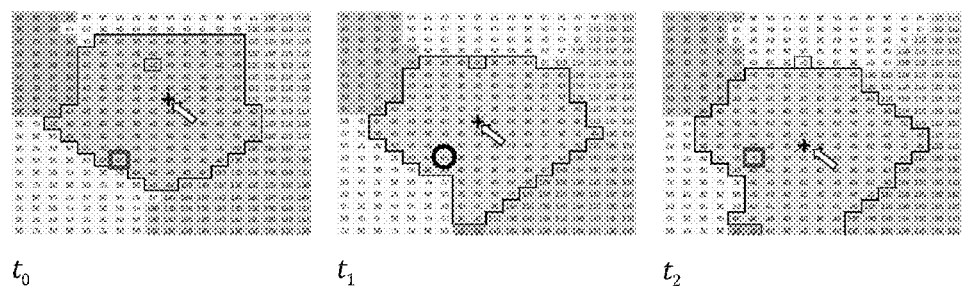
FIG. 6 illustrates the difficulty of a micro tracking at the example of an incorrect pixel mapping.
Figure 7:
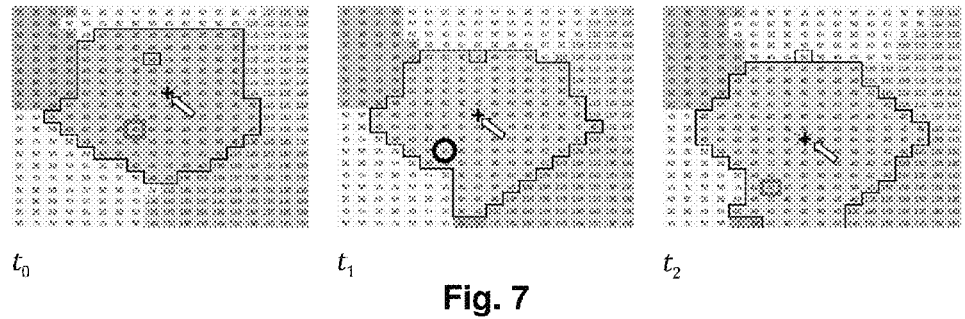
FIG. 7 shows the appropriate pixel mapping for the designated pixel in image $t_1$.

As described above, temporal image processing and computer vision algorithms require a micro tracking describing a pixel-to-pixel correspondence between temporally adjacent superpixels. The difficulty of a correct micro tracking is depicted in FIGS. 6 and 7, where the superpixels labeled with the value 40 have to be tracked, or more precisely in this example the pixel position of image $t_1$ identified by the black circle has to be mapped to appropriate pixel positions within image $t_0$ and image $t_2$. For all sub-pictures in FIGS. 6 and 7 the possibly temporally moving superpixel mass centers are marked by a cross, whereas an arrow illustrates the translational motion of the superpixel. The dark grey rectangles in FIG. 6 show the constant grid position without the consideration of any superpixel motion or superpixel distortion over time.

Keeping the constant grid position would result in an inaccurate mapping and would introduce additional distortions on top of those already present. FIG. 7 shows the appropriate pixel mapping for the designated pixel in $t_1$ to the correct pixel positions in images $t_0$ and $t_2$, marked by medium grey rectangles.

The approach disclosed here provides a method to generate correct pixel-to-pixel correspondences between temporally adjacent superpixels or multi-view superpixels and copes with translational superpixel motions as well as superpixel shape distortions. First a simple method called Uniform Scaled Superpixel Mapping (USM) is described, followed by an advanced method called Quadrant Scaled Superpixel Mapping (QSM). The detailed description starts with explaining the steps needed for the USM method. Subsequently follows the description of the additional steps which are required for utilizing the QSM method.

The Uniform Scaled Superpixel Mapping method works as follows. For each pixel $p_N(i)$ located in the origin superpixel $SP_N$ in image $t_n$ a corresponding pixel $p_M(j)$ is required, being located within the temporally consistent superpixel $SP_M$ in image $t_m$:

$$p_N(i) \to p_M(j) \text{ with } \begin{array}{l} SP_N: p_N(i) \quad i \in \{1, \ldots I\} \\ SP_M: p_M(j) \quad j \in \{1, \ldots J\} \end{array}.$$

In general the number of pixels I contained in $SP_N$ and the number of pixels J contained in $SP_M$ are different. Therefore, the resulting pixel mappings can be one-to-many, one-to-one, many-to-one, and a combination of them.

The following steps describe how to determine for each pixel $P_N(i)$ located within the origin superpixel $SP_N$ a single corresponding pixel $p_M(j)$ located within the target superpixel $SP_M$. This can be done separately for all superpixels within an image:

STEP 1: Get the angle $\alpha$ defined by the polar coordinates for the origin pixel $p_N(i)$ by taking the mass center of $SP_N$ as the origin of the coordinate system.

STEP 2: Determine the topology value $TP_N(i)$ of the origin pixel $P_N(i)$.

STEP 3: Determine the relative distance of the origin pixel $p_N(i)=[x_N(i),y_N(i)]$ from the mass center $MC_N=[X_N, Y_N]$, which is calculated as $$D_N(i) = \sqrt{\frac{(x_N(i) - X_N)^2}{w_{x,N}^2} + \frac{(y_N(i) - Y_N)^2}{w_{y,N}^2}}$$

with $$w_{x,N} = \max_{i \in I} x_N(i) - \min_{i \in I} x_N(i)$$
$$w_{y,N} = \max_{i \in I} y_N(i) - \min_{i \in I} y_N(i).$$

STEP 4: Examine those pixels within the target superpixel $SP_M$ intersected by the ray with the same angle $\alpha$ beginning from the mass center $MC_M=[X_M,Y_M]$, where the angle $\alpha$ is calculated as $$\alpha = \begin{cases} \arctan\left(\frac{y_N(i,\phi)}{x_N(i,\phi)} \cdot w_\infty\right) + \pi; & x_N(i) < 0 \\ \arctan\left(\frac{y_N(i,\phi)}{x_N(i,\phi)} \cdot w_\infty\right); & x_N(i) > 0 \\ \pi/2; & x_N(i) = 0 \text{ and } y_N(i) > 0 \\ -\pi/2; & y_N(i) = 0 \text{ and } y_N(i) < 0 \end{cases}$$

with $$w_\infty = \frac{w_{y,M}}{w_{x,M}} \cdot \frac{w_{x,N}}{w_{y,N}}.$$

STEP 5: Along the ray $j(\alpha)$, determine the topology value $TP_M(j)$ of pixel $p_M(j)$.

STEP 6: Along the ray $j(\alpha)$, determine the relative distance of the pixels $p_M(j)=[x_M(j),y_M(j)]$ from the mass center $MC_M=[X_M, Y_M]$, which is calculated as $$D_M(j) = \sqrt{\frac{(x_M(j) - X_M)^2}{w_{x,M}^2} + \frac{(y_M(j) - Y_M)^2}{w_{y,M}^2}}$$

with $$w_{x,M} = \max_{j \in J} x_M(j) - \min_{j \in J} x_M(j)$$
$$w_{y,M} = \max_{j \in J} y_M(j) - \min_{j \in J} y_M(j).$$

STEP 7: Along the ray $j(\alpha)$, determine the feature vector distance $\Delta V(i,j)$:

$$\Delta V(i,j) = \sqrt{(D_N(i) - D_M(j))^2 + (TP_N(i) - TP_M(j))^2}.$$

STEP 8: Find the minimum of all vector distances along the ray $j(\alpha)$ and take its coordinates as mapping location:

$$(x_j, y_j) = \text{coordinates}_j \left\{ \min_{j(\alpha)} \Delta V(i,j) \right\}.$$

Figure 8:
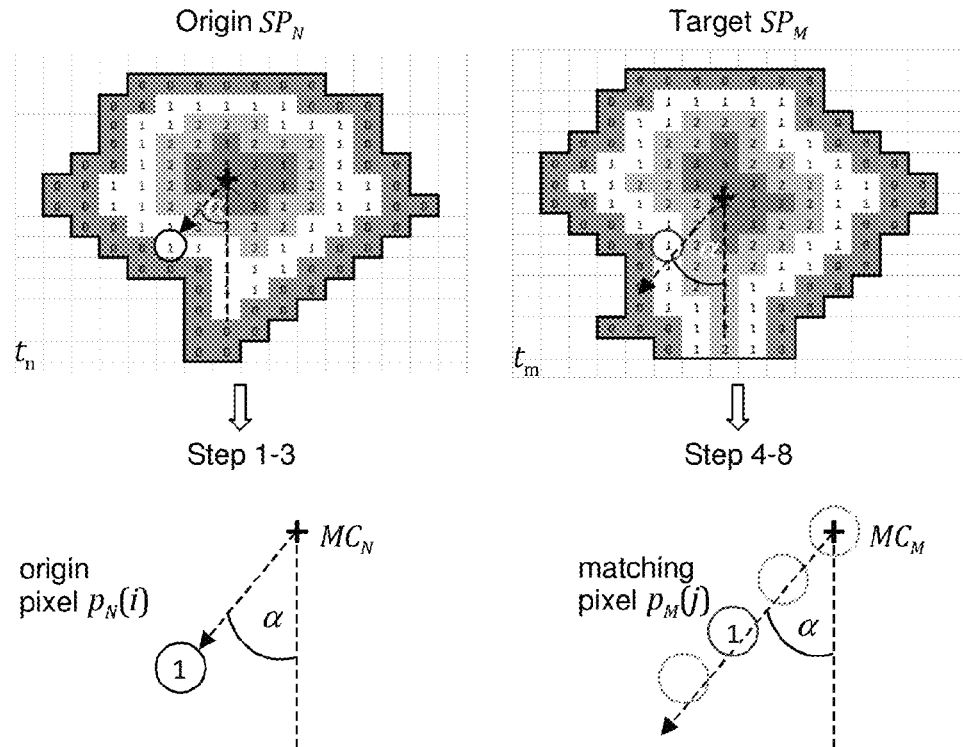
FIG. 8 depicts a simplified version of the proposed superpixel mapping method.

FIG. 8 depicts a simplified version of the superpixel mapping method, where the left part depicts the treatment of data within the origin superpixel, as described in steps 1 to 3, and the right part depicts the remaining steps 4 to 8 to find the appropriate match within the target superpixel. In this figure the black crosses mark the mass center positions, whereas the black circles and the dark grey circles designate the origin pixel position and the micro match pixel position, respectively.

Figure 9:
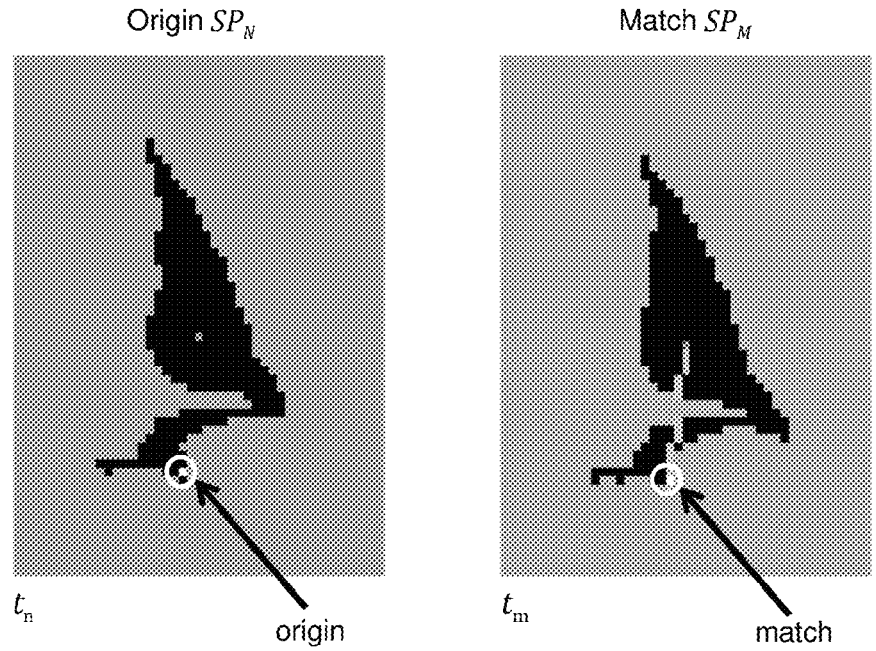
FIG. 9 illustrates a calculated mapping example.

A calculated mapping example is given in FIG. 9, which documents the quality of the described method. The treated superpixel shapes are concave, which does in no manner jeopardize the quality of the resulting mapping.

The Quadrant Scaled Superpixel Mapping method differs from the USM only in STEP 3, STEP 4, and STEP 6 by using a more sophisticated weight calculation. The principle of the operations described for determining the relative distances $D_N$ and $D_M$ remain the same, but the weight denominators are substituted by more adaptive versions.

Figure 10:
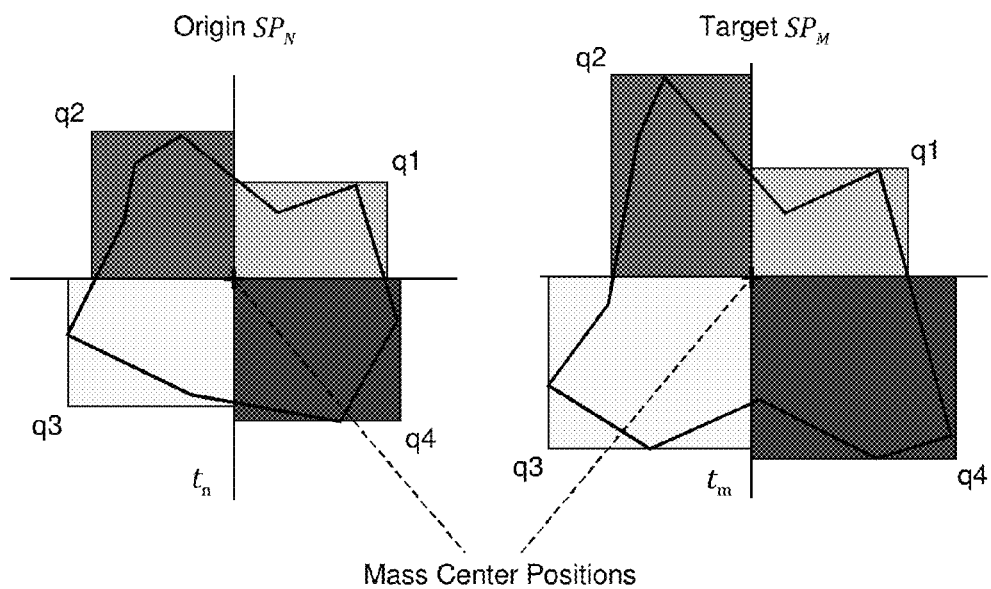
FIG. 10 shows the division of superpixels into four quadrants for a Quadrant Scaled Superpixel Mapping method.

The idea behind the QSM specific scaling is depicted in FIG. 10. It shows the origin superpixel $SP_N$ and its corresponding time consistent target superpixel $SP_M$. All superpixels are divided into four quadrants relative to their mass center pixels. The bold lines describe the shapes of the superpixels, which change from image $t_n$ to $t_m$. This shape distortion is analyzed separately for each of the quadrants by determining the horizontal and the vertical scaling for each of the quadrants on its own. Therefore, the weights used for calculating the distances $D_N$ and $D_M$ depend on the quadrant the distances are calculated for.

For the QSM method the weights w are substituted by quadrant related weights $q^\phi$, where $\phi \in \{1, 2, 3, 4\}$ indicates the quadrant the calculation is executed for.

Thus, the QSM substitutes the weights in STEP 3 by $$q_{x,N}^\phi = \max_{i \in I} x_N(i, \phi) - \min_{i \in I} x_N(i, \phi)$$

$$q_{y,N}^\phi = \max_{i \in I} y_N(i, \phi) - \min_{i \in I} y_n(i, \phi).$$

and, accordingly, in STEP 6 by $$q_{x,M}^\phi = \max_{j \in J} x_M(j,\phi) - \min_{j \in J} x_M(j,\phi)$$

$$q_{y,M}^\phi = \max_{j \in J} y_M(j,\phi) - \min_{j \in J} y_M(j,\phi).$$

Further, the distance measures in STEP 3 and STEP 6 change to $$D_N(i, \phi) = \sqrt{\frac{(x_N(i, \phi) - X_N)^2}{\left(q_{x,N}^\phi\right)^2} + \frac{(y_N(i, \phi) - Y_N)^2}{\left(q_{y,N}^\phi\right)^2}}$$

and $$D_M(j, \phi) = \sqrt{\frac{(x_M(j, \phi) - X_M)^2}{\left(q_{x,M}^\phi\right)^2} + \frac{(y_M(j, \phi) - Y_M)^2}{\left(q_{y,M}^\phi\right)^2}},$$

respectively. Finally, the angle $\alpha$ for QSM in STEP 4 changes to $$\alpha = \begin{cases} \arctan\left(\frac{y_N(i, \phi)}{x_N(i, \phi)} \cdot q_\alpha^\phi\right) + \pi; & x_N(i, \phi) < 0 \\ \arctan\left(\frac{y_N(i, \phi)}{x_N(i, \phi)} \cdot q_\alpha^\phi\right); & x_N(i, \phi) < 0 \\ \pi/2; & x_N(i, \phi) = 0 \text{ and } y_N(i, \phi) > 0 \\ -\pi/2; & y_N(i, \phi) = 0 \text{ and } y_N(i, \phi) < 0 \end{cases}$$

with $$q_\alpha^\phi = \frac{q_{y,M}^\phi}{q_{x,M}^\phi} \cdot \frac{q_{x,N}^\phi}{q_{y,N}^\phi}.$$

Figure 11:
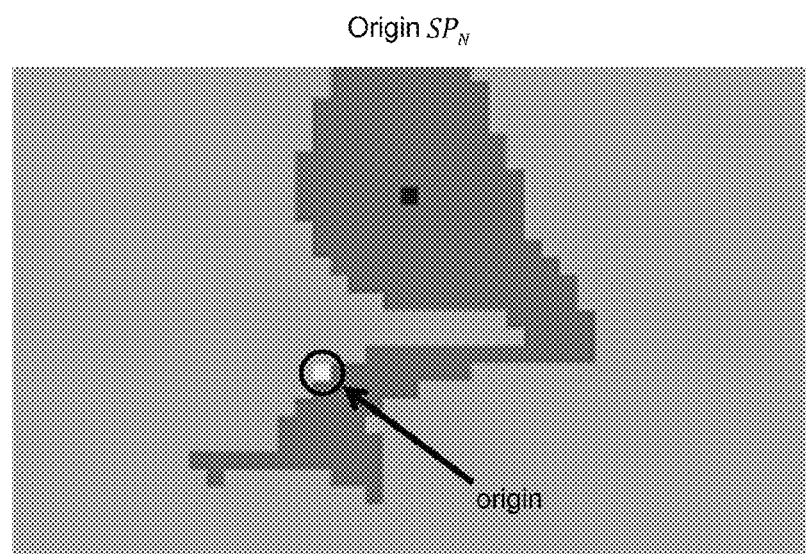
FIG. 11 depicts an origin pixel being mapped to a target pixel.
Figure 12:
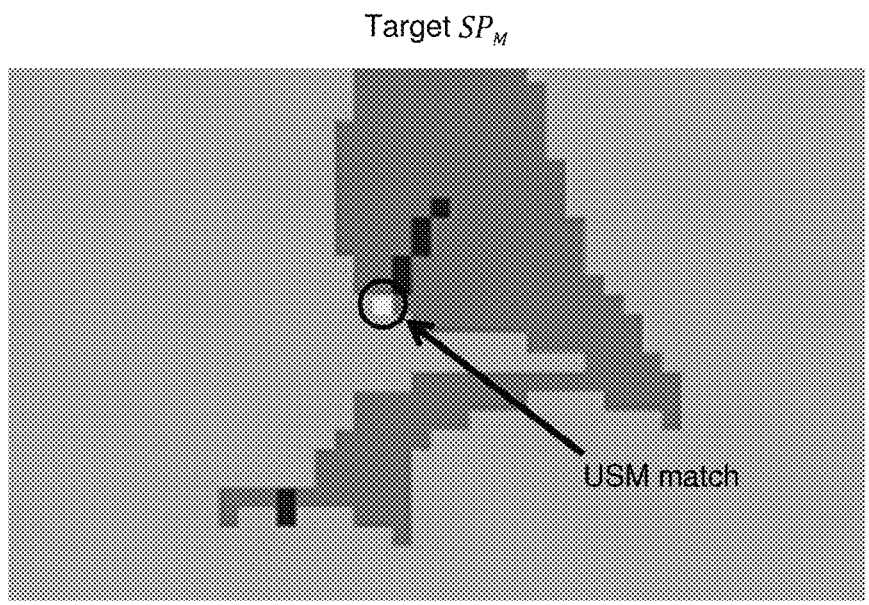
FIG. 12 shows the mapping result generated with a USM approach.
Figure 13:
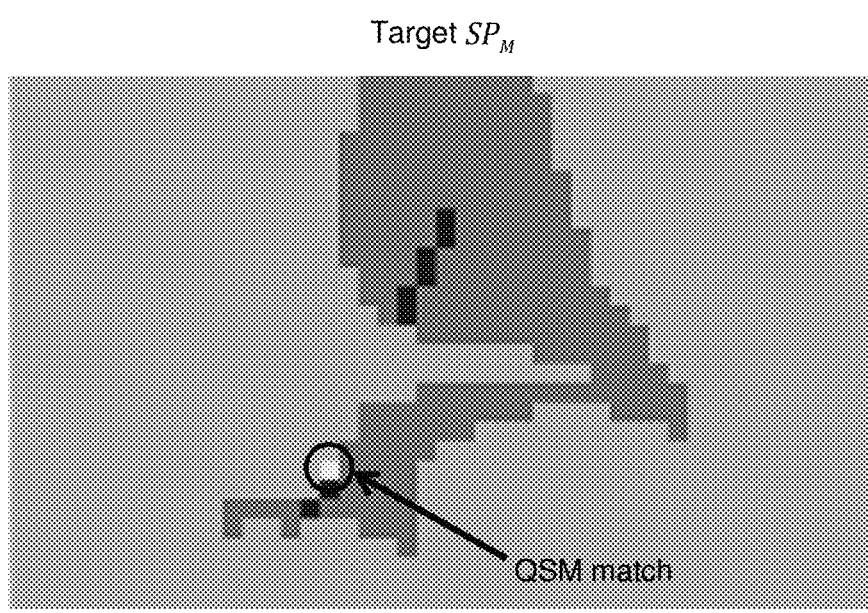
FIG. 13 shows the mapping result generated with a QSM approach.

FIGS. 11 to 14 show the advantageous behavior of the QSM approach in comparison to the USM method. FIG. 11 depicts an origin pixel $P_N(i)$ being mapped to the target pixel $p_M(J)$, where FIG. 12 is the result generated with the USM approach and FIG. 13 is the result generated with the QSM approach. The shapes in these figures show a distortion between $SP_N$ and $SP_M$, whose extent is not uniform. The origin pixel in FIG. 11 is located at the border of the shape. When searching along the black marked angle ray $\alpha$ in FIG. 12, the corresponding pixel candidates exclude the appropriate location, because the shape distortions are treated neglectfully. In case of the QSM approach, however, as visible in FIG. 13, the shape distortions are treated correctly and the angle ray $\alpha$ includes suitable superpixel locations. As a result, a better and more appropriate match is found.

Figure 14:
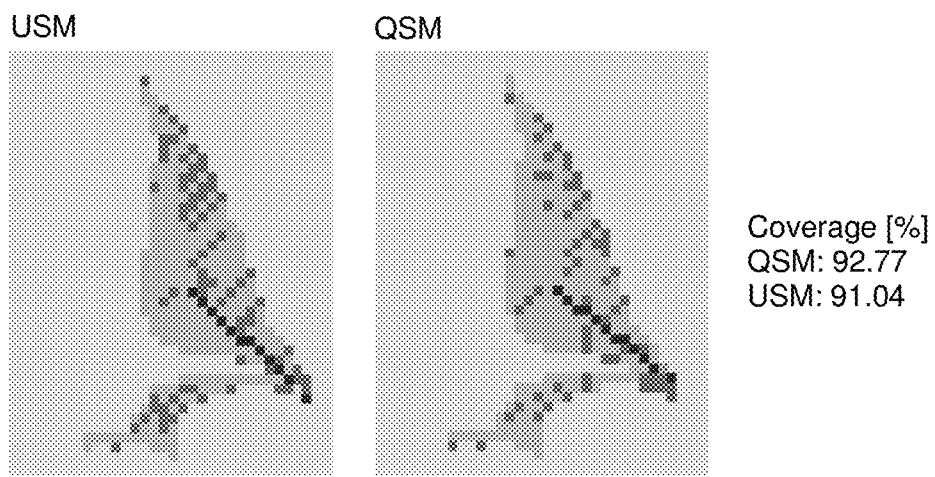
FIG. 14 demonstrates higher coverage gained through the use of the QSM approach.

FIG. 14 shows the positive aspect of a higher coverage gained through the use of the QSM approach. The coverage of the micro tracking is indicated by pixels colored light grey if being addressed by the mapping and colored dark grey if being skipped instead. As can be seen in FIG. 14, the USM approach results in more pixels in dark grey being omitted from the mapping than the QSM approach. In the latter case the amount of addressed superpixel locations is higher, which is also documented in coverage percentages shown.

Figure 15:
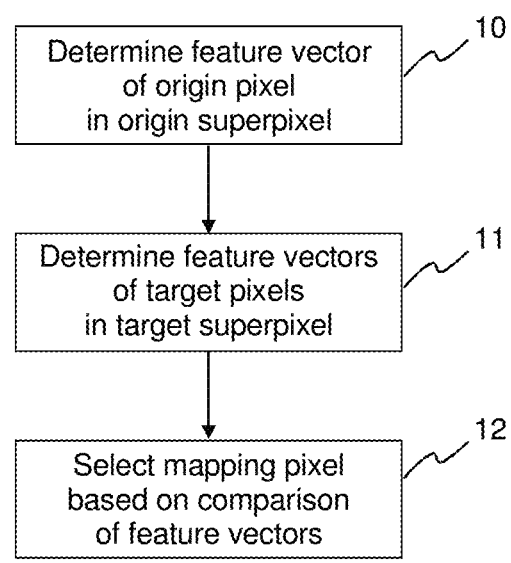
FIG. 15 schematically illustrates a method according to the invention for pixel mapping.

A method according to the invention for pixel mapping between an origin superpixel in a first image and a target superpixel in a second image is schematically illustrated in FIG. 15. First a feature vector of an origin pixel of the origin superpixel is determined 10. Subsequently, feature vectors of target pixels of the target superpixel are determined 11. A mapping pixel for the origin pixel is then selected 12 among the target pixels based on a comparison of the feature vectors.

Figure 16:
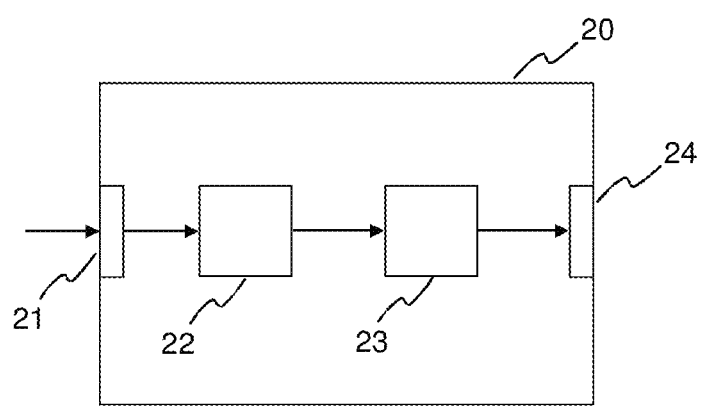
FIG. 16 schematically depicts a first embodiment of an apparatus configured to perform a method according to the invention.

FIG. 16 depicts one embodiment of an apparatus 20 configured to perform a method according to the invention. The apparatus 20 comprises an input 21 for receiving a first image and a second image, e.g. from a network or a local storage. A feature vector determining unit 22 determines 10 a feature vector of an origin pixel of an origin superpixel in the first image. The feature vector determining unit 22 further determines 11 feature vectors of target pixels of a target superpixel in the second image. A mapping pixel selector 23 then selects 12 a mapping pixel for the origin pixel among the target pixels based on a comparison of the feature vectors. The processing results are preferably made available via an output 24 of the apparatus 20. The feature vector determining unit 22 and the mapping pixel selector 23 are either implemented as dedicated hardware or as software running on a processor. They may also be combined in a single unit. Also, the input 21 and the output 24 may be combined into a single bi-directional interface.

Figure 17:
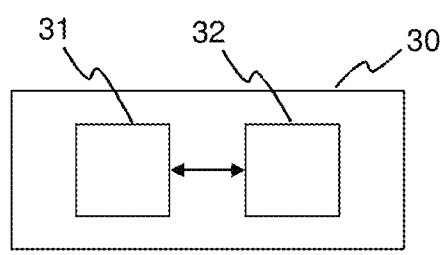
FIG. 17 schematically illustrates a second embodiment of an apparatus configured to perform a method according to the invention.

Another embodiment of an apparatus 30 configured to perform the method according to the invention is schematically illustrated in FIG. 17. The apparatus 30 comprises a processing device 31 and a memory device 32 storing instructions that, when executed, cause the apparatus to perform steps according to one of the described methods.

For example, the processing device 31 can be a processor adapted to perform the steps according to one of the described methods. In an embodiment said adaptation comprises that the processor is configured, i.e. for example programmed, to perform steps according to one of the described methods.

REFERENCES

[1] X. Ren et al.: "*Learning a classification model for segmentation*", IEEE International Conference on Computer Vision (ICCV) 2003, pp. 10-17.

[2] R. Achanta et al.: "*SLIC superpixels compared to state-of-the-art superpixel methods*", IEEE Transactions on Pattern Analysis and Machine Intelligence, Vol. 34 (2012), pp. 2274-2282.

[3] M. Reso et al.: "*Temporally Consistent Superpixels*", International Conference on Computer Vision (ICCV), 2013, pp. 385-392.

The invention claimed is:

1. A method for pixel mapping between an origin superpixel in a first image and a target superpixel in a second image, the method comprising:
   determining feature vectors of origin pixels of the origin superpixel;
   determining feature vectors of target pixels of the target superpixel; and
   selecting a mapping pixel for an origin pixel among the target pixels based on a comparison of the feature vectors,
   wherein a feature vector of a pixel comprises a relative distance of the pixel to a mass center of the superpixel and a topology value of the pixel.

2. The method according to claim 1, wherein the first image and the second image are successive images of a sequence of images and/or multi-view images of a scene.

3. The method according to claim 1, wherein the topology value of the pixel indicates a minimal distance of the pixel to a nearest superpixel border.

4. The method according to claim 1, wherein the target pixels for an origin pixel are determined by:
   determining a ray starting in a mass center of the origin superpixel and passing through the origin pixel;
   determining a corresponding ray for the target superpixel starting in a mass center of the target superpixel; and
   selecting target pixels along the corresponding ray starting in the mass center of the target superpixel.

5. The method according to claim 1, wherein the mapping pixel for an origin pixel is selected by determining a best matching feature vector.

6. The method according to claim 5, wherein a matching quality of a feature vector is determined using an Euclidian vector distance.

7. The method according to claim 6, wherein the best matching feature vector is the feature vector resulting in a first found minimum of the Euclidian distance.

8. The method according to claim 4, wherein for determining the corresponding ray for the target superpixel a scaling of the target superpixel relative to the origin superpixel is taken into account.

9. The method according to claim 8, wherein the superpixel is divided into four quadrants and a horizontal and a vertical scaling is determined individually for each of the quadrants.

10. A computer readable non-transitory storage medium having stored therein instructions enabling pixel mapping between an origin superpixel in a first image and a target superpixel in a second image, wherein the instructions, when executed by a computer, cause the computer to:
    determine feature vectors of origin pixels of the origin superpixel;
    determine feature vectors of target pixels of the target superpixel; and
    select a mapping pixel for an origin pixel among the target pixels based on a comparison of the feature vectors,
    wherein a feature vector of a pixel comprises a relative distance of the pixel to a mass center of the superpixel and a topology value of the pixel.

11. The computer readable non-transitory storage medium according to claim 10, wherein the first image and the second image are successive images of a sequence of images and/or multi-view images of a scene.

12. The computer readable non-transitory storage medium according to claim 10, wherein the topology value of the pixel indicates a minimal distance of the pixel to a nearest superpixel border.

13. The computer readable non-transitory storage medium according to claim 10, wherein the instructions cause the computer to determine the target pixels for an origin pixel by:
    determining a ray starting in a mass center of the origin superpixel and passing through the origin pixel;
    determining a corresponding ray for the target superpixel starting in a mass center of the target superpixel; and
    selecting target pixels along the corresponding ray starting in the mass center of the target superpixel.

14. The computer readable non-transitory storage medium according to claim 10, wherein the instructions cause the computer to select the mapping pixel for an origin pixel by determining a best matching feature vector.

15. The computer readable non-transitory storage medium according to claim 14, wherein the instructions cause the computer to determine a matching quality of a feature vector using an Euclidian vector distance.

16. The computer readable non-transitory storage medium according to claim 15, wherein the best matching feature vector is the feature vector resulting in a first found minimum of the Euclidian distance.

17. The computer readable non-transitory storage medium according to claim 13, wherein the instructions cause the computer to take a scaling of the target superpixel relative to the origin superpixel into account for determining the corresponding ray for the target superpixel.

18. The computer readable non-transitory storage medium according to claim 17, wherein the instructions cause the computer to divide the superpixel into four quadrants and to determine a horizontal and a vertical scaling individually for each of the quadrants.

19. An apparatus configured to perform pixel mapping between an origin superpixel in a first image and a target superpixel in a second image, the apparatus comprising:
    a feature vector determining unit configured to determine feature vectors of origin pixels of the origin superpixel and to determine feature vectors of target pixels of the target superpixel; and
    a mapping pixel selector configured to select a mapping pixel for an origin pixel among the target pixels based on a comparison of the feature vectors,
    wherein a feature vector of a pixel comprises a relative distance of the pixel to a mass center of the superpixel and a topology value of the pixel.

20. The apparatus according to claim 19, wherein the first image and the second image are successive images of a sequence of images and/or multi-view images of a scene.

21. The apparatus according to claim 19, wherein the topology value of the pixel indicates a minimal distance of the pixel to a nearest superpixel border.

22. The apparatus according to claim 19, wherein the apparatus is configured to determine the target pixels for an origin pixel by:
    determining a ray starting in a mass center of the origin superpixel and passing through the origin pixel;
    determining a corresponding ray for the target superpixel starting in a mass center of the target superpixel; and selecting target pixels along the corresponding ray starting in the mass center of the target superpixel.

23. The apparatus according to claim 19, wherein the mapping pixel selector is configured to select the mapping pixel for an origin pixel by determining a best matching feature vector.

24. The apparatus according to claim 23, wherein the feature vector determining unit is configured to determine a matching quality of a feature vector using an Euclidian vector distance.

25. The apparatus according to claim 24, wherein the best matching feature vector is the feature vector resulting in a first found minimum of the Euclidian distance.

26. The apparatus according to claim 22, wherein the apparatus is configured to take a scaling of the target superpixel relative to the origin superpixel into account for determining the corresponding ray for the target superpixel.

27. The apparatus according to claim 26, wherein the apparatus is configured to divide the superpixel into four quadrants and to determine a horizontal and a vertical scaling individually for each of the quadrants.

28. An apparatus configured to perform pixel mapping between an origin superpixel in a first image and a target superpixel in a second image, the apparatus comprising a processing device and a memory device having stored therein instructions, which, when executed by the processing device, cause the apparatus to:
   determine feature vectors of origin pixels of the origin superpixel;
   determine feature vectors of target pixels of the target superpixel; and
   select a mapping pixel for an origin pixel among the target pixels based on a comparison of the feature vectors,
   wherein a feature vector of a pixel comprises a relative distance of the pixel to a mass center of the superpixel and a topology value of the pixel.

29. The apparatus according to claim 28, wherein the first image and the second image are successive images of a sequence of images and/or multi-view images of a scene.

30. The apparatus according to claim 28, wherein the topology value of the pixel indicates a minimal distance of the pixel to a nearest superpixel border.

31. The apparatus according to claim 28, wherein the instructions cause the apparatus to determine the target pixels for an origin pixel by:
   determining a ray starting in a mass center of the origin superpixel and passing through the origin pixel;
   determining a corresponding ray for the target superpixel starting in a mass center of the target superpixel; and
   selecting target pixels along the corresponding ray starting in the mass center of the target superpixel.

32. The apparatus according to claim 28, wherein the instructions cause the apparatus to select the mapping pixel for an origin pixel by determining a best matching feature vector.

33. The apparatus according to claim 32, wherein the instructions cause the apparatus to determine a matching quality of a feature vector using an Euclidian vector distance.

34. The apparatus according to claim 33, wherein the best matching feature vector is the feature vector resulting in a first found minimum of the Euclidian distance.

35. The apparatus according to claim 31, wherein the instructions cause the apparatus to take a scaling of the target superpixel relative to the origin superpixel into account for determining the corresponding ray for the target superpixel.

36. The apparatus according to claim 35, wherein the instructions cause the apparatus to divide the superpixel into four quadrants and to determine a horizontal and a vertical scaling individually for each of the quadrants.

\* \* \* \* \*